(12) United States Patent
Vogel et al.

(10) Patent No.: US 8,070,423 B2
(45) Date of Patent: Dec. 6, 2011

(54) FAN AIR FLOW MEASUREMENT SYSTEM

(75) Inventors: Tim Vogel, Independence, MO (US); Josiah Wiley, Kansas City, MO (US); Jeff Beneke, Peculiar, MO (US)

(73) Assignee: Ruskin Company, Grandview, MO (US)

( * ) Notice: Subject to any disclaimer, the term of this patent is extended or adjusted under 35 U.S.C. 154(b) by 517 days.

(21) Appl. No.: 12/316,175

(22) Filed: Dec. 10, 2008

(65) Prior Publication Data

US 2010/0143125 A1 Jun. 10, 2010

(51) Int. Cl.
*F01D 25/00* (2006.01)
(52) U.S. Cl. ...................... 415/118; 415/121.3
(58) Field of Classification Search .................. 415/118, 415/121.3
See application file for complete search history.

(56) References Cited

U.S. PATENT DOCUMENTS

| | | | |
|---|---|---|---|
| 4,372,195 A | 2/1983 | Dorius | 98/115 R |
| 5,505,763 A | 4/1996 | Reighard et al. | 95/19 |
| 5,586,861 A * | 12/1996 | Berger | 415/118 |
| 5,929,333 A * | 7/1999 | Nair | 73/204.11 |
| 6,186,744 B1 | 2/2001 | Wolochuk | 417/44.2 |
| 2002/0006155 A1* | 1/2002 | Wienand et al. | 374/185 |
| 2006/0160412 A1* | 7/2006 | Symons | 439/501 |
| 2007/0240490 A1* | 10/2007 | Desrochers et al. | 73/31.01 |

* cited by examiner

*Primary Examiner* — Ajay K Arora
(74) *Attorney, Agent, or Firm* — J. A. Thurnau, Esq.; T. A. Dougherty, Esq.; P. N. Dunlap, Esq.

(57) ABSTRACT

A fan air flow measurement sensor comprising a housing having a sensor cap, a thermistor pair disposed within the housing, each thermistor projecting through the sensor cap a predetermined distance above the sensor cap, a flange extending normally from the housing, the flange engagable with a mounting surface, a sensor circuit comprising a multiplexer for controlling each thermistor, and for measuring a condition of each thermistor, and for receiving and transmitting signals, and a cable for connecting the sensor to a multiplexing circuit.

9 Claims, 12 Drawing Sheets

FAN AIR FLOW MEASUREMENT SYSTEM

FIELD OF THE INVENTION

The invention relates to a fan air flow measurement system, and more particularly, to a fan air flow measurement system comprising a thermistor pair mounted in sensor housing which is flush mounted in a centrifugal fan inlet bell.

BACKGROUND OF THE INVENTION

Ventilation systems in various industrial settings are usually required to have a certain minimum flow rates. For example, in commercial buildings a minimum level of air flow is required to maintain a healthy air quality within the building.

To ensure that the air flow requirements for a particular system are met it is desirable to be able to precisely measure the rate of air flow through the system. Systems without precise flow measuring capability are frequently overdesigned in terms of excess capacity. They are routinely operated at excess levels to ensure compliance with operating specifications. This adds unnecessary expense to the systems and their operation.

Further, system filters become clogged with particulates increasing pressure drop and robbing fan performance.

It is known that various methods of measuring air flow in a ventilation system can, in some cases, dramatically decrease the efficiency of the system. Traditional fan inlet devices (other than piezometer rings located outside of the air stream) can produce a dramatic fan performance drop from between 15% to 30%.

The efficiency of a ventilation system is a measure of how readily air flows through the system or, conversely, the system's resistance to air flow. Each component of a system through which air flows presents a certain amount of resistance to air flow. This resistance is determined by the size and shape of the component over which the air flows. Generally, components that are wider, smoother, straighter and shorter have less resistance to air flow, and therefore provide a more efficient system.

Improved efficiency can permit the use of a lower capacity fan to generate a given level of air flow in a system, and can require less energy to maintain a given level or air flow. In this manner, improving the efficiency of a ventilation system can reduce both the equipment and operating costs for the system. Many systems for measuring airflow, however, have just the opposite effect. Many flow measuring systems increase a system's resistance to air flow, and thereby reduce the system's efficiency.

Existing air flow measurement systems have had to balance the trade-offs between efficiency and precision of measurement. Existing measurement systems typically create an obstruction or constriction within the air flow, and measure the effect of the obstruction or constriction on the air pressure at a certain point in the system. Increasing the size of the obstruction or amount of the constriction generally increases the precision of the flow measurements but also increases the negative impact of the measuring system on the system efficiency.

For example, a pitot tube measuring system is an obstruction-type measurement device. A typical pitot tube has an orifice facing directly upstream to provide a total pressure measurement and an orifice oriented to provide a static pressure measurement. From this information, the velocity of the air stream can be determined. However, each pitot tube creates a disturbance in the air flow, thereby increasing turbulence and resistance and decreasing efficiency.

A venturi tube measuring system is another example of an air flow measurement system that operates by constricting the air flow in the system. A typical venturi tube has an inlet diameter which narrows down to a throat of a smaller diameter. The smaller cross-sectional area at the throat results in an increase in air velocity. A pressure tap monitors the pressure at the inlet, and a second pressure tap monitors the pressure within the throat. This pressure differential is then used to estimate the flow rate.

A measuring system similar to the venturi tube may have a limited aperture for constricting the air flow within a conduit. A pressure sensor is generally located upstream from the aperture and another pressure sensor is located downstream from the aperture. The pressure differential can be used to determine the approximate air flow through the aperture. This type of flow sensor typically creates a significant pressure drop in the air stream that can dramatically reduce system efficiency.

Recently, technological advances in the thermistor industry have made it possible to use ceramic reinforced glass body thermistors for stable and repeatable use in thermal dispersion type air measurement applications.

Representative of the art is U.S. Pat. No. 5,586,861 which discloses a centrifugal fan provided with an inlet cone that serves to measure air flow through the fan. The inlet cone has a flared inlet for receiving air, a narrow throat, and a flared outlet for expelling air into the center of a rotating fan wheel. Pressure taps are provided to measure the static pressure at the inlet and the throat. The difference between these pressures, adjusted for the empirically determined characteristics of the inlet cone, can be used as an indication of air flow. In one aspect of the invention, a controller monitors the pressure differential, calculates a flow rate based on the characteristics of the cone, and adjusts the fan speed to maintain a desired air flow.

Reference is made to applicants pending U.S. application Ser. No. 12/286,930 filed Oct. 3, 2008 for a Gas Measurement System.

What is needed is a fan air flow measurement system comprising a thermistor pair mounted in sensor housing which is flush mounted in a centrifugal fan inlet bell. The present invention meets this need.

SUMMARY OF THE INVENTION

The primary aspect of the invention is to provide a fan air flow measurement system comprising a thermistor pair mounted in sensor housing which is flush mounted in a centrifugal fan inlet bell.

Other aspects of the invention will be pointed out or made obvious by the following description of the invention and the accompanying drawings.

The invention comprises a fan air flow measurement sensor comprising a housing having a sensor cap, a thermistor pair disposed within the housing, each thermistor projecting through the sensor cap a predetermined distance above the sensor cap, a flange extending normally from the housing, the flange engagable with a mounting surface, a sensor circuit comprising a multiplexer for controlling each thermistor, and for measuring a condition of each thermistor, and for receiving and transmitting signals, and a cable for connecting the sensor to a multiplexing circuit.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENTS

Figure 1:
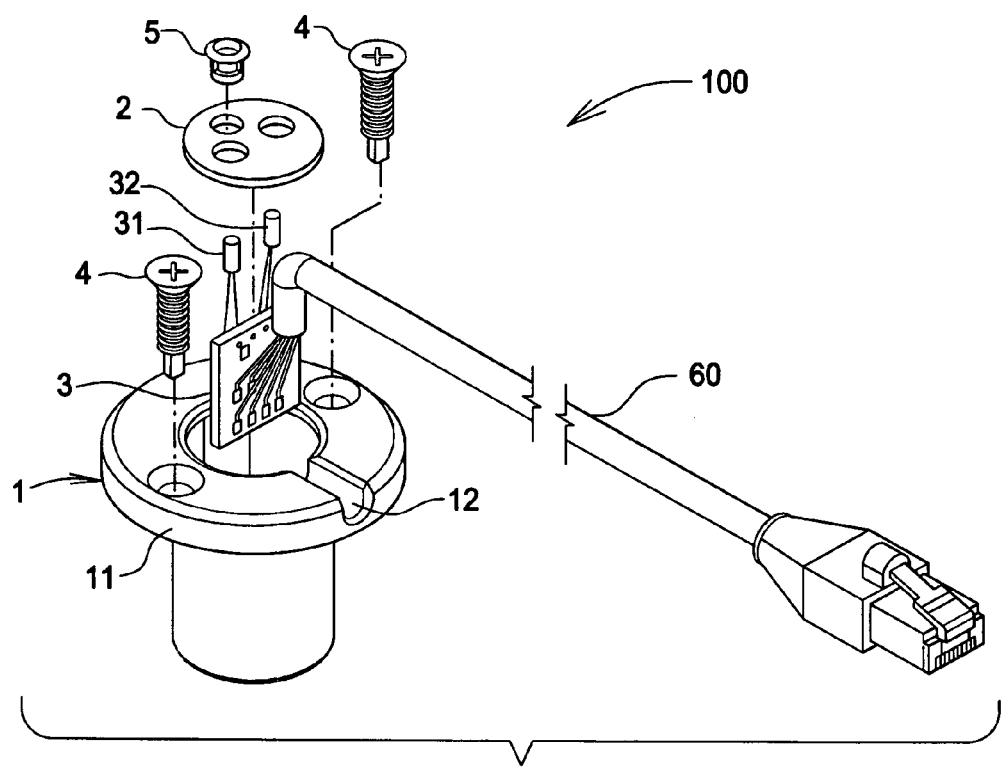
FIG. 1 is an exploded perspective view of a sensor unit.

FIG. 1 is an exploded perspective view of a sensor unit. The sensor unit 100 comprises a sensor cap 2. Sensor cap 2 is fixed to housing 1 by a fastener 5. Sensor cap 2, which is preferable stainless steel, provides protection for the thermistors and acts as a reference gage for the precise location of the sensors (thermistors) within the flanged circuit housing 1.

Sensor cap 2 facilitates the proper placement of each thermistor within a sensor unit and subsequent placement of the sensor unit within a centrifugal fan inlet bell. The dimension from the top of each thermistor sensor to the top surface of the sensor cap is a predetermined distance. Notch 12 in flange 11 receives CAT5e network cable 60 in order to minimize the profile of the sensor unit in a fan inlet air stream being measured.

The system operates within a temperature range of approximately −40° F. to approximately 180° F. Thermistors 31, 32 may comprise model GC2183T-3-0 by Spectrum Sensors and Controls. The resistance of the thermistor varies according to its temperature, which is a function of the gas velocity flowing past the thermistor. Thermistors can be classified into two types. In a first type, the resistance increases with increasing temperature, and the device is called a positive temperature coefficient (PTC) thermistor, or posistor. In a second type, the resistance decreases with increasing temperature, and the device is called a negative temperature coefficient (NTC) thermistor. Both may be used in the inventive system. Each pair of thermistors 31, 32 may also be referred to in this specification as a "sensor node" or "sensor pair".

Figure 2:
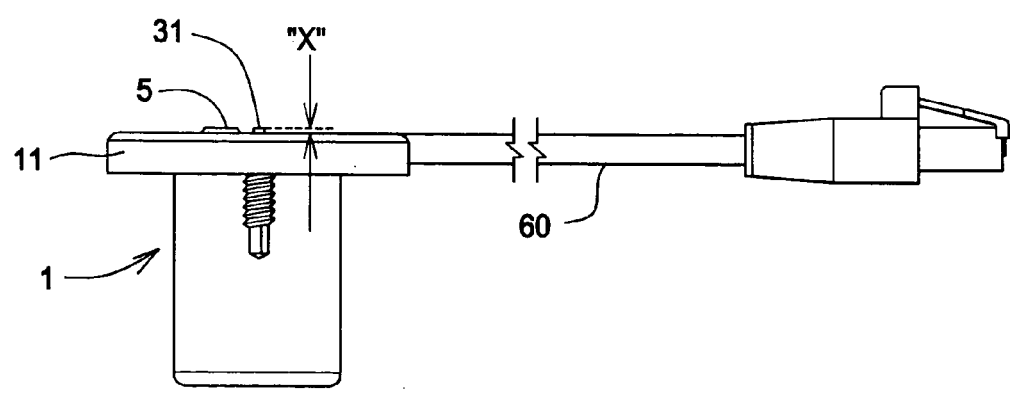
FIG. 2 is a side view of a sensor unit.

FIG. 2 is a side view of a sensor unit. The dimension "X" extends from the surface of flange 11 to the top of a thermistor 31, 32. For example for a typical installation the dimension "X" is approximately 0.03 inches, but may be greater depending upon the service.

The partial cover afforded by the sensor cap 2 protects the thermistors 31, 32 from airborne particulate and provides calibrated heat dissipation. A ceramic base on each glass bead thermistor reduces dispersion loss through the thermistor leads.

Figure 7:
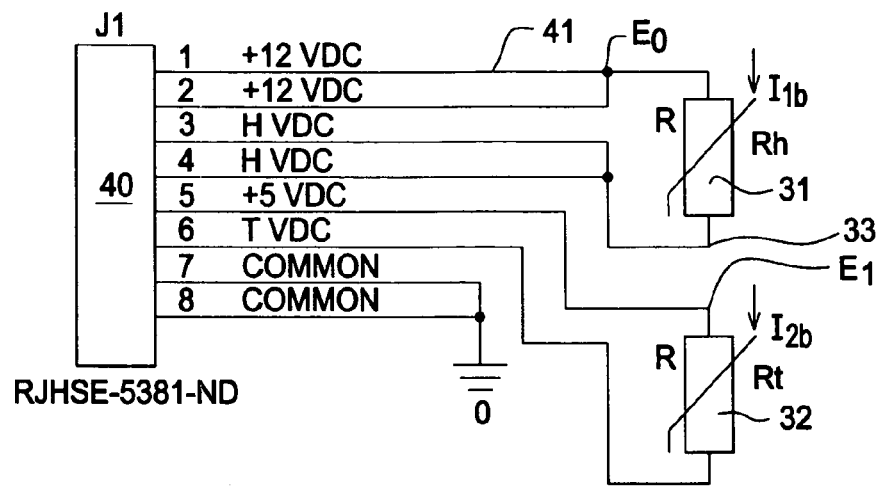
FIG. 7 is a sensor circuit schematic.

Thermistors 31 and 32 are connected to thermal dispersion type sensing circuit 3 (See also FIG. 7). Sensor circuit 3 comprises a multiplexer for controlling each thermistor (See also FIG. 11). Circuit 3 measures a condition of each thermistor and receives and transmits signals.

Fasteners 4 are used to fix the unit 100 to a mounting surface, for example, to a fan inlet bell. Housing 1 is filled with a known potting material to prevent movement of circuit 3 and thermistors 31, 32 during operation.

Figure 3:
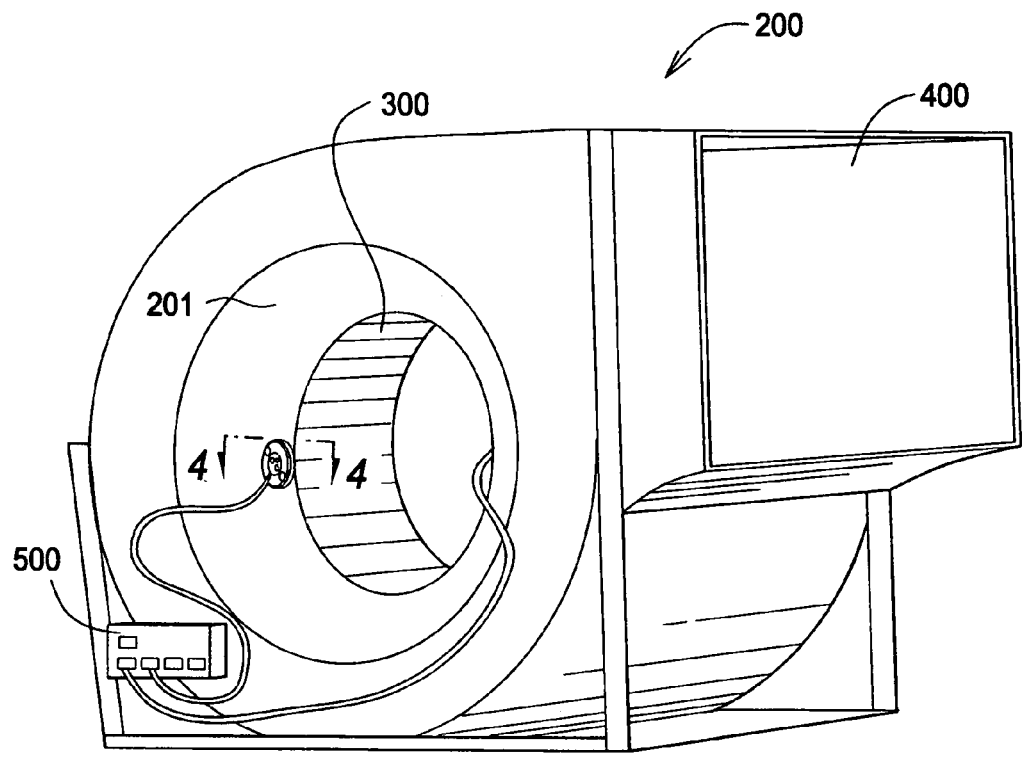
FIG. 3 is a side perspective view of a fan including the sensor unit.

FIG. 3 is a side perspective view of a fan including the sensor unit. Fan 200 is typically a centrifugal fan, however, the instant invention can be used in any application which includes a fan having a ducted inlet. Fan 200 further comprises a known fan wheel 300. Inlet bell 201 directs the inlet air flow to wheel 300.

Sensor circuit 3, in concert with the sensor location within the housing 1 and placement of the housing 1 within the fan inlet bell 201, improves the accuracy of a mass air flow measurement by focusing a volume or air onto the sensors without diminishing or amplifying the flow. Computational fluid dynamics may be utilized to aid in developing the optimum location of the sensor elements 31, 32 within the housing 1 and the overall placement of the unit 100 within a fan inlet bell. This increases the overall accuracy of the air measurement device.

Fan discharge 400 is typically connected to a system ductwork (not shown).

Figure 4:
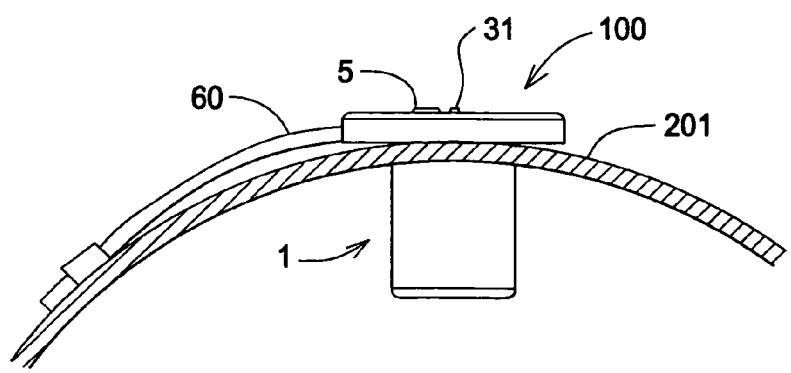
FIG. 4 is a detail of a sensor unit installed in a fan inlet bell.

FIG. 4 is a detail of a sensor unit installed in a fan inlet bell. A sensor unit 100 is shown flush mounted within the inlet bell 201. Each cable 60 is fixed to the surface of the inlet bell using fasteners known in the art.

The sensor unit and system accounts for stratified air flow by averaging multiple velocity and temperature points in the fan inlet. Each sensing unit is connected to a microprocessor that calculates flow and temperature. Each sensor circuit is wired to a router 500 (see also FIG. 13) that is also connected to a multiplexing unit. Calibration data which corresponds to each thermistor 31, 32 is stored within the multiplexing unit (see sensor circuit 3 and multiplexer FIG. 11). With the calibration data stored in the multiplexing unit, the sensor units can be connected to the control transmitter in any order or configuration.

After the multiplexing unit collects the data from each sensor circuit, its sends a digital signal to the control transmitter (See FIGS. 10a, 10b, 10c, 10d). The control transmitter displays the air velocity and temperature that is measured within the fan inlet bell. A user interface on the control transmitter panel allows the end user to change the measurement units and adjust the offset and gain. Further, the flush-mount, low profile design of the sensor unit significantly reduces or eliminates fan performance issues that result when other mass flow measurement devices (obstructions) are placed within the fan inlet bell.

The features of the instant sensor unit and system include an ideal flow representation at each sensing point, namely, it is not diminished or amplified. This is accomplished by the placement and location of the thermistors in each sensing unit and the location of each sensing unit within the fan inlet bell.

Figure 6:
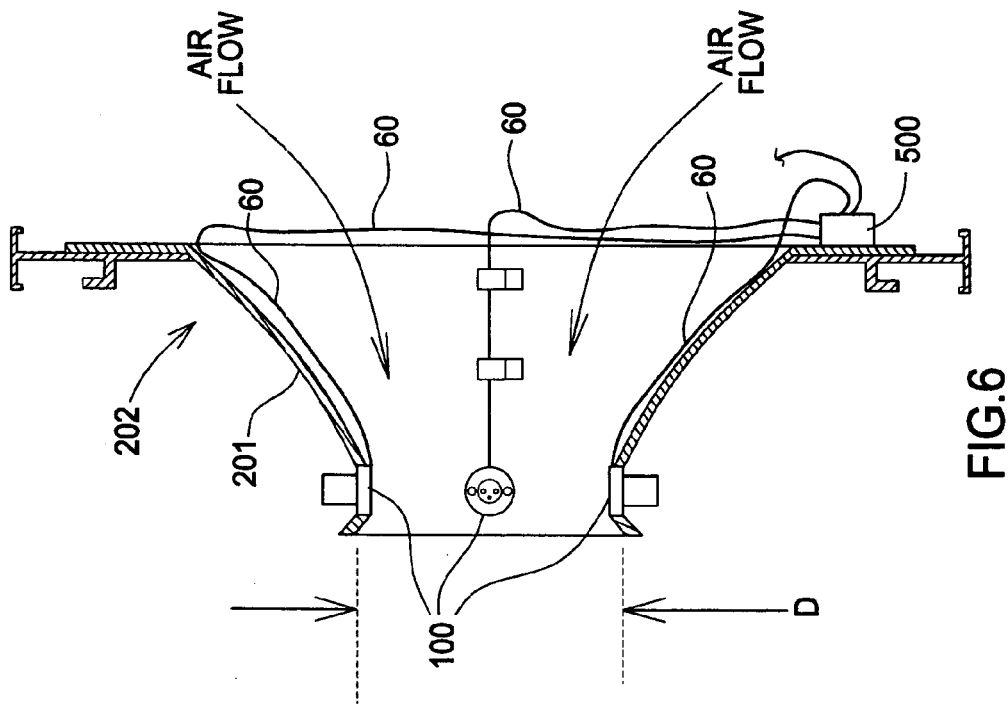
FIG. 6 is a section view of FIG. 5.

Each sensor unit is located at the point of minimum diameter (D) of the inlet bell, see FIG. 6. This position provides the optimal location as to air flow parameters for the flow entering the fan wheel. This includes optimal flow characteristics in the flow boundary layer at the surface of the inlet bell in which the sensor unit is typically located.

Figure 5:
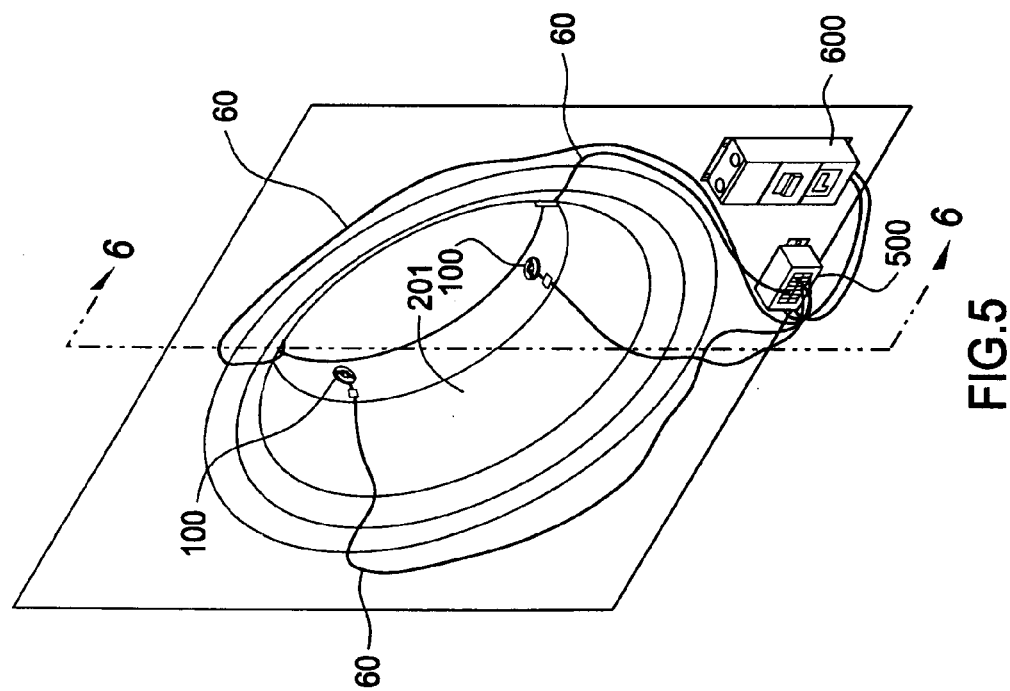
FIG. 5 is a plan view of an inlet bell with the sensor units installed.

FIG. 5 is a plan view of an inlet bell with the sensor units installed. An array of sensor units 100 comprises each unit 100 positioned at 0°, 90°, 180° and 270° about the inlet bell. Each unit 100 is connected to the router 500 by cables 60. Each cable 60 is fixed to the surface of the inlet bell using means known in the art. In the alternative each cable 60 may be fixed to the inner surface 202 (see FIG. 6) of the inlet bell to further reduce the apparatus exposed to the inlet air flow. Multiplexer and transmitter are contained in housing 600.

FIG. 6 is a section view of FIG. 5. Sensor units 100 are typically located at the narrowest portion "D" of the inlet bell 201. It is at this location that the inlet air flow is most fully developed, and, the velocity is at a maximum.

Figure 13A:
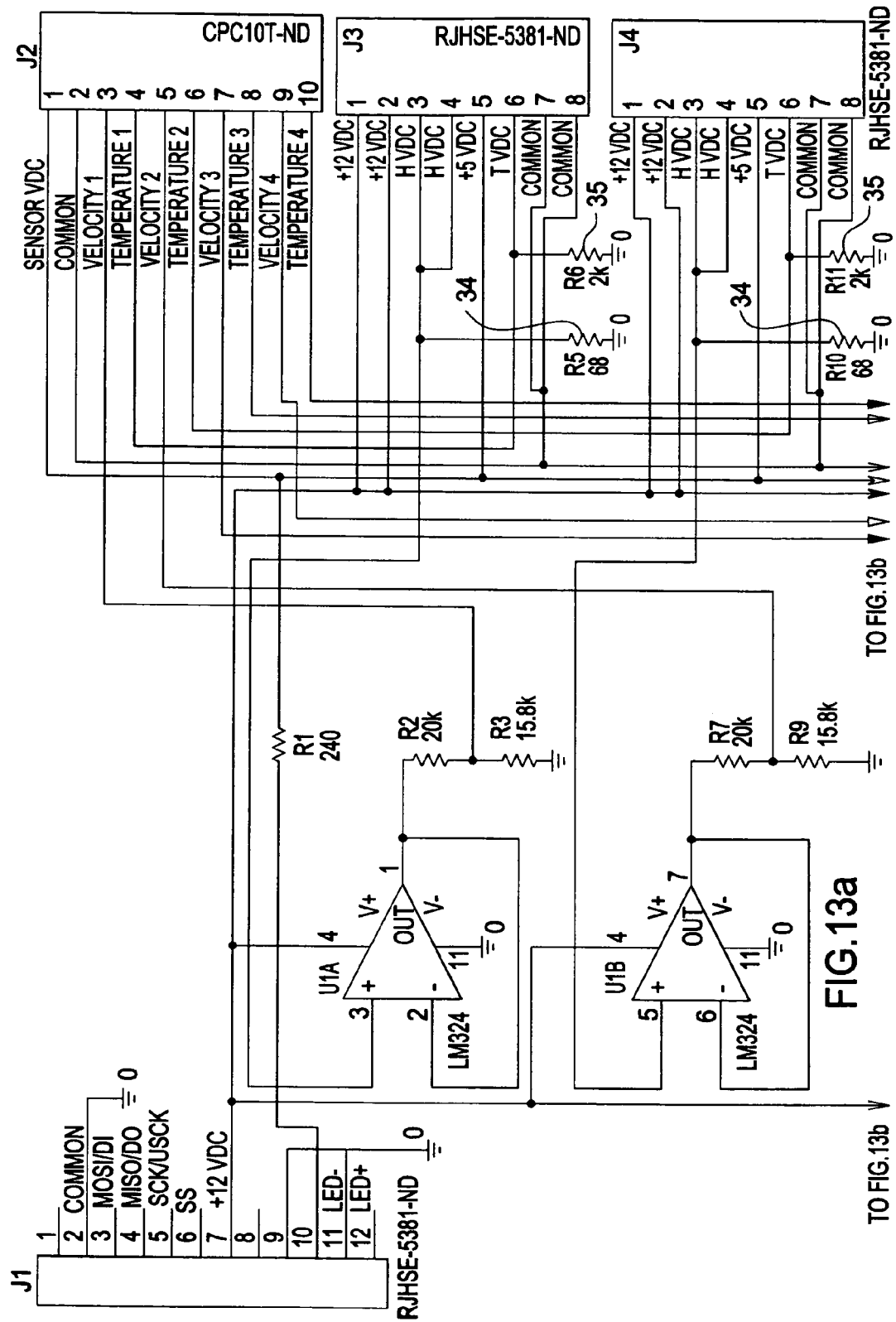
FIG. 13 is a schematic for the router.
Figure 13B:
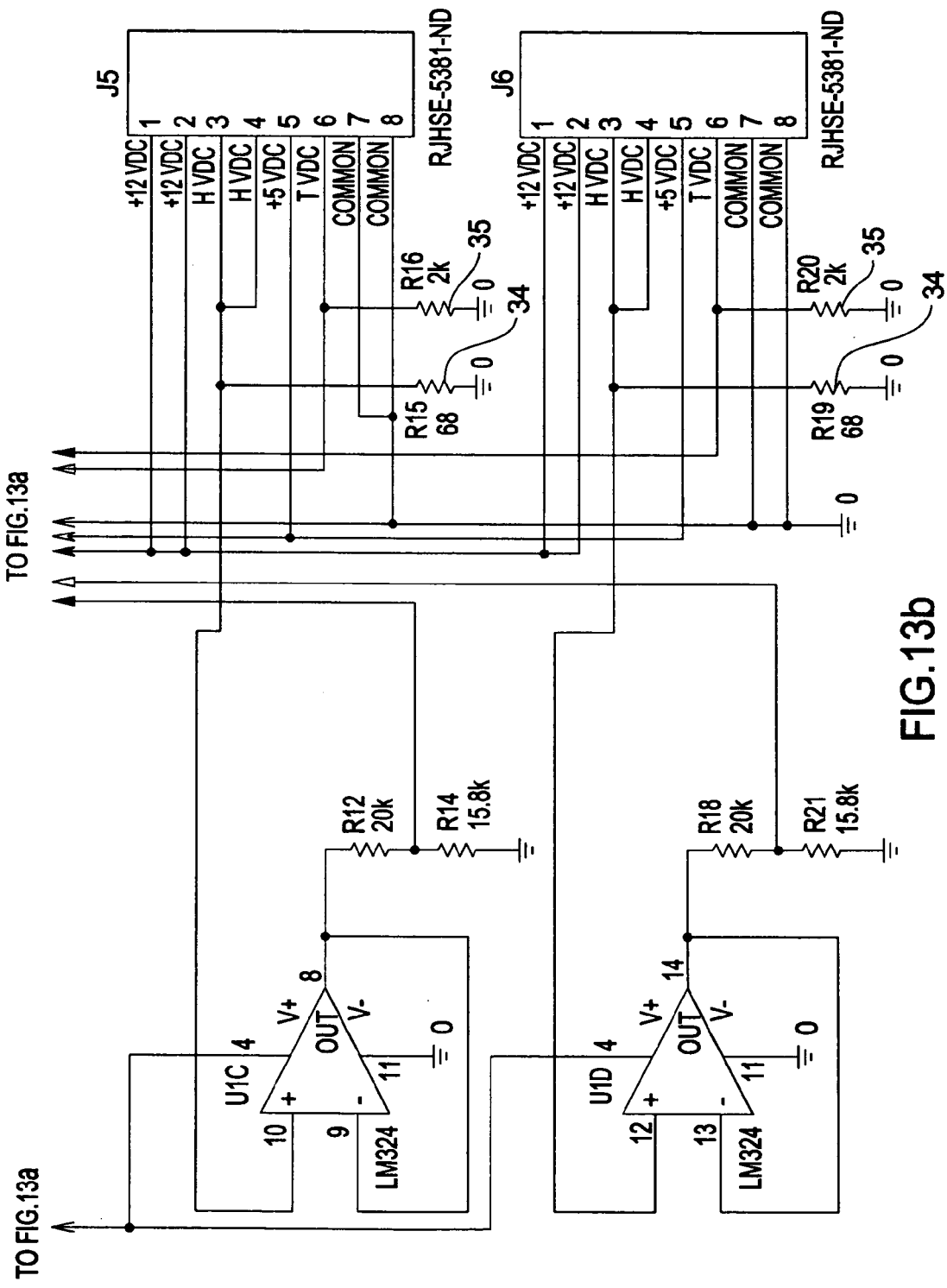

FIG. 7 is a sensor circuit schematic. Thermistor 31 is connected at to a 12 VDC power supply from the router circuit at J1 (FIG. 13). Thermistor 32 is connected to a +5 VDC power supply from the router circuit at J1.

Each thermistor and reference thermistor is also referred to as a sensor node. Each pair 31, 32 comprises a sensor node. Each sensor node includes its own microprocessor 3 (See FIG. 1). The microprocessor will store the thermistor 31, 32 calibration data and calculate the airflow at each sensor node through the shroud.

After calculating the air flow, the microprocessor 3 at each sensor node will relay the information to the main circuit board through a digital network. This will prevent the need to match each thermistor 31, 32 in the node with the correct input on the control panel.

A main circuit board will read the data from each of the thermistors and calculate the gas velocity. One 4-20 mA signal is proportional to the air velocity, and one 4-20 mA signal is proportional to air temperature. These signals are communicated to a fan/HVAC automation system. It is possible to control a control damper with the temperature output by enabling this feature in an interface menu. A setpoint is set using the interface menu. A resistor can be used to convert the 4-20 mA signal to 2-10 VDC.

A 24 VAC transformer will provide the required power to operate the circuit.

In operation, the voltage from the power supply 40 connected to the terminal E0 provides sufficient current through the lead 41, the thermistor 31, and lead 33 to cause significant self-heating in Rh, for example, a temperature rise of 300° C. Typical circuit values are Rh=2186 ohms at 25° C.; Rt=2186 ohms at 25° C.; E0=12 volts; and E1=5 volts.

Thermistor Rt and Rh have a precise temperature coefficient of resistance such as presented by a negative coefficient thermistor. Rt is connected to a 68 ohm resistor 34 and Rh is connected to a 2000 ohm resistor 35 located on the router circuit, see FIG. 13. The 68 ohm and 2000 ohm resistors have a very low temperature coefficient, typically less than approximately 5 ppm/degrees C. The current flow I1 creates a voltage drop between Rh and the 68 ohm resistor, used to determine the "self-heated" temperature of Rh. The current flow I2 through Rt and the 2000 ohm resistor creates a voltage drop used to determine the ambient gas temperature across Rt.

When current flows through a thermistor, it generates heat, which raises the temperature of the thermistor above ambient. As air moves across the heated thermistor, the resistance of the thermistor changes the power dissipation. The rate of transfer is described by Newton's law of cooling:

$$PE = K(T(R) - TO)$$

Where T(R) is the temperature of the thermistor as a function of its resistance R, T0 is the temperature of the surroundings, and K is the dissipation constant, usually expressed in units of milliwatts per ° C. Rh of the above circuit represents the self heated thermistor 31 and Rt represents the reference thermistor 32.

The first step in calculating air velocity is to determine the ambient air temperature. For accurate temperature measurements, the resistance/temperature curve must be determined. The Steinhart-Hart equation is a widely used third-order approximation:

$$\frac{1}{T} = a + b \ln(R) + c \ln^3(R)$$

Where a, b and c are called the Steinhart-Hart parameters, and must be specified for each thermistor. T is the temperature in Kelvin and R is the resistance in ohms. The following coefficients are provided by the manufacture of the thermistor for the Steinhart-Hart equation:

| | |
|---|---|
| A = | 0.0018711064 |
| B = | 0.0003126432 |
| C = | 0.0000004417 |

The ambient air temperature can be calculated using the Steinhart-Hart equation solving for T. Subtracting 273.15 converts the value to degrees Celsius.

$$T = \left(\frac{1}{a + b \ln(R) + c \ln^3(R)}\right) - 273.15$$

Once the ambient air temperature is known, the air velocity can be calculated using Newton's law of cooling and solving for the dissipation constant.

$$PE = K(T(R) - TO)$$

$$W/°C._{"K"} = \frac{PE}{\left(\frac{\text{Self Heated Temperature}}{\text{Reference Temperature}}\right)}$$

$$W/°C. \frac{PE_{R2}}{\left(\frac{1}{a + b \ln(R2) + c \ln^3(R2)} - 273.15\right) - \left(\frac{1}{a + b \ln(R3) + c \ln^3(R3)} - 273.15\right)}$$

Once the self heated power dissipation is determined, the air velocity can be calculated using a fourth order polynomial. The forth order polynomial is derived from testing on a wind tunnel at various velocities.

$$y = -0.2467x^4 + 9.2836x^3 - 85.639x^2 + 339.39x - 485.54$$

$$R2 = 0.9999$$

Where x represents the power dissipation and y represents the velocity. The values for each of the variables in the noted equations are examples and are not intended to limit the breadth of the invention as claimed.

Due to the negative temperature coefficient of thermistors 31, 32 the current draw is largest when there is no airflow. In the preferred embodiment the maximum current draw per sensor will be approximately 150 mA per sensor (thermistor). With a maximum of 4 sensors per transmitter the total current draw for the sensors without flow will be approximately 600 mA.

Figure 8:
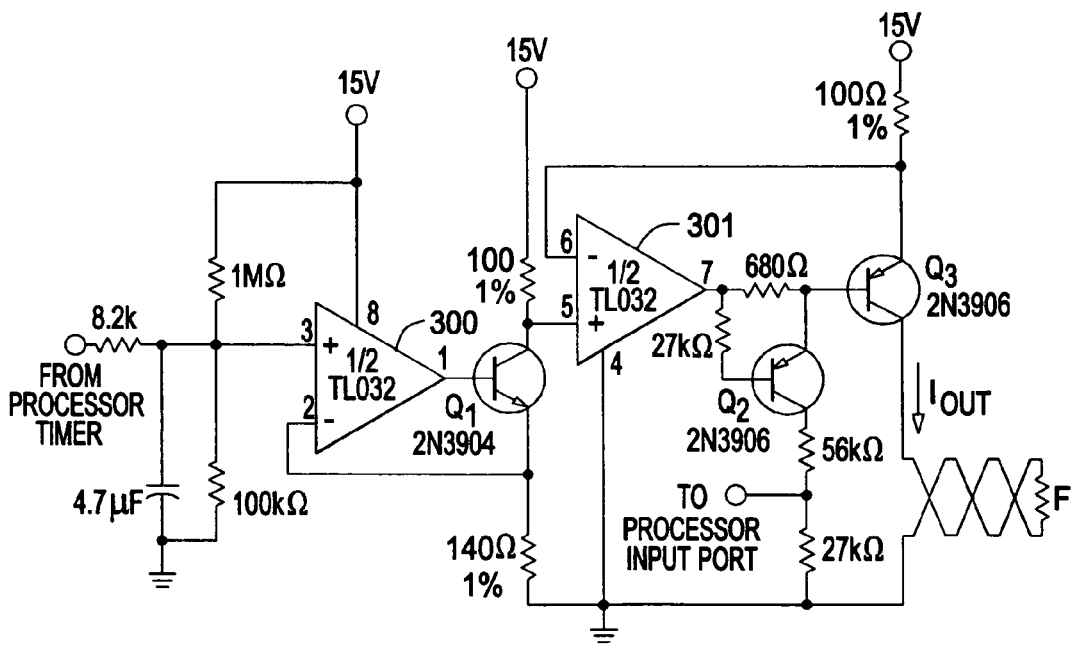
FIG. 8 is a schematic of the current output circuit in the transmitter circuit.

Referring to FIG. 8, there are two 4-20 mA op amp output circuits on the transmitter board. One output is proportional to the measured velocity and one output is proportional to the measured air temperature, see FIG. 8 which is a schematic of the current output circuit in the transmitter circuit.

The circuit delivers its drive from the pulse width modulation (PWM) of the microprocessor. The duty cycle of the PWM determines the output current of the circuit. The RC network in front of the first op-amp 300 conditions the pulse from the processor into a constant 0-5 VDC. In addition, the network ensures that the minimum input voltage to op amp 300 is close to 100 mV, even if the input is at ground potential. This minimum voltage ensures that the feedback loop of op amp 300 does not return to the positive rail when transistor Q1 is off.

The emitter resistor of Q1 sets the current span of the circuit. A potentiometer was used in place of the resistor for calibration of the circuit. With a 5V drive from the microcontroller, the output current is 20 mA. A grounded input results in less than 1 mA. A duty cycle of 12.5% drives the loop at 4 mA and exhibits linear control to full scale.

The purpose of the second operational amplifier 301 is to provide a current source, and a grounded return path for the current loop. The PNP transistor Q3 provides this high side drive. The open loop feedback portion of this circuit lets the microcontroller know that a fault condition exists on the line. The processor can then indicate the status of the analog outputs on the LCD.

When an open-loop condition occurs, Q3 shunts the entire loop current back through its emitter base junction and through the 680 ohm resistor to the op amp. The voltage developed across the 680 ohm resistor turns on Q2, resulting in a logic one feedback to the microcontroller.

Op-amp selection is important when using a single supply topology. An operational amplifier that can maintain stability close to its negative, or ground, rail is important.

Figure 12:
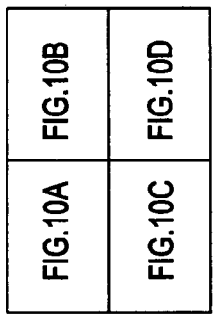
FIG. 12 is a layout for FIGS. 10a, 10b, 10c, 10d.
Figure 10A:
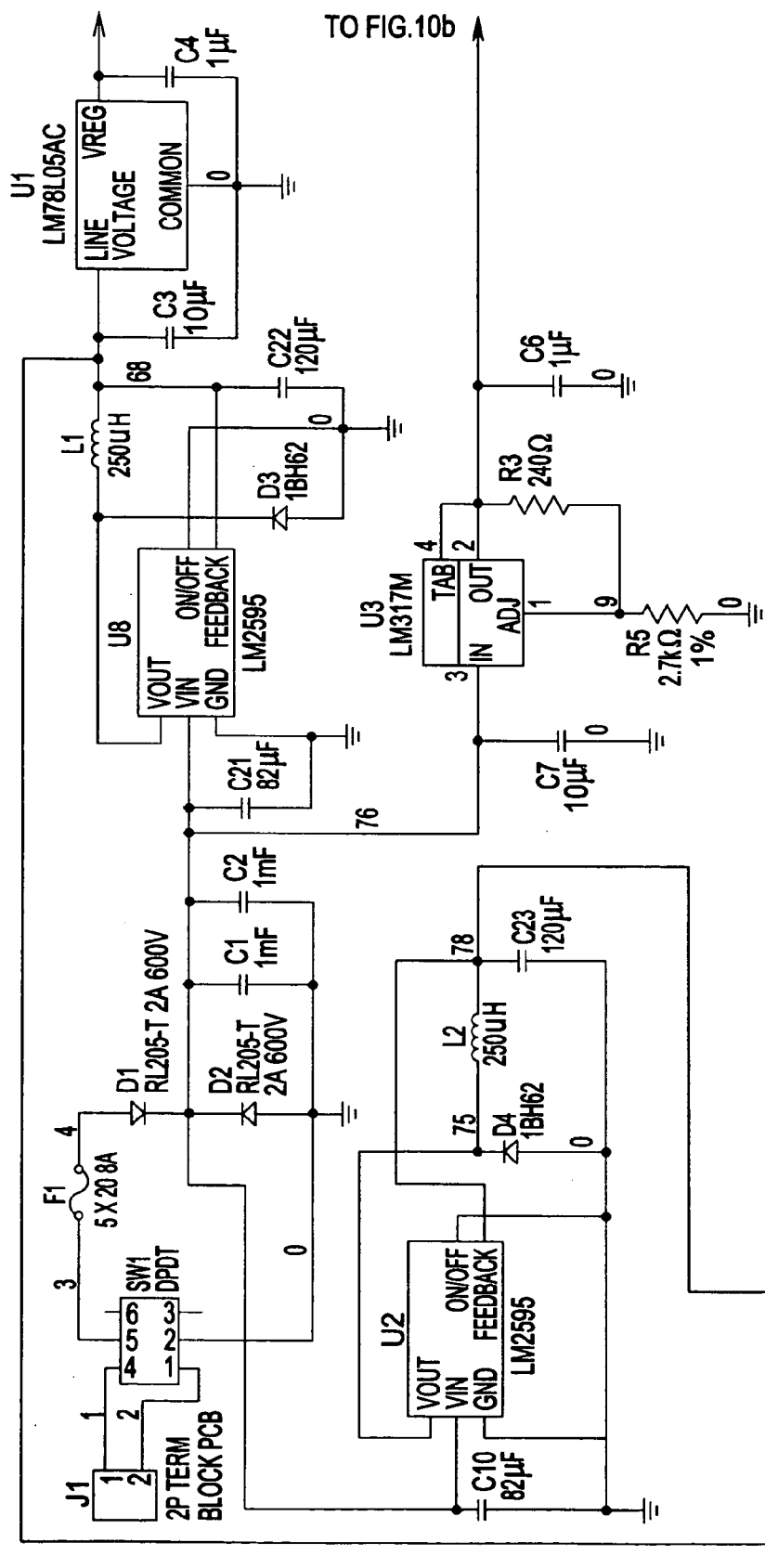
FIGS. 10a, 10b, 10c, 10d are a schematic of the transmitter circuit.
Figure 10B:
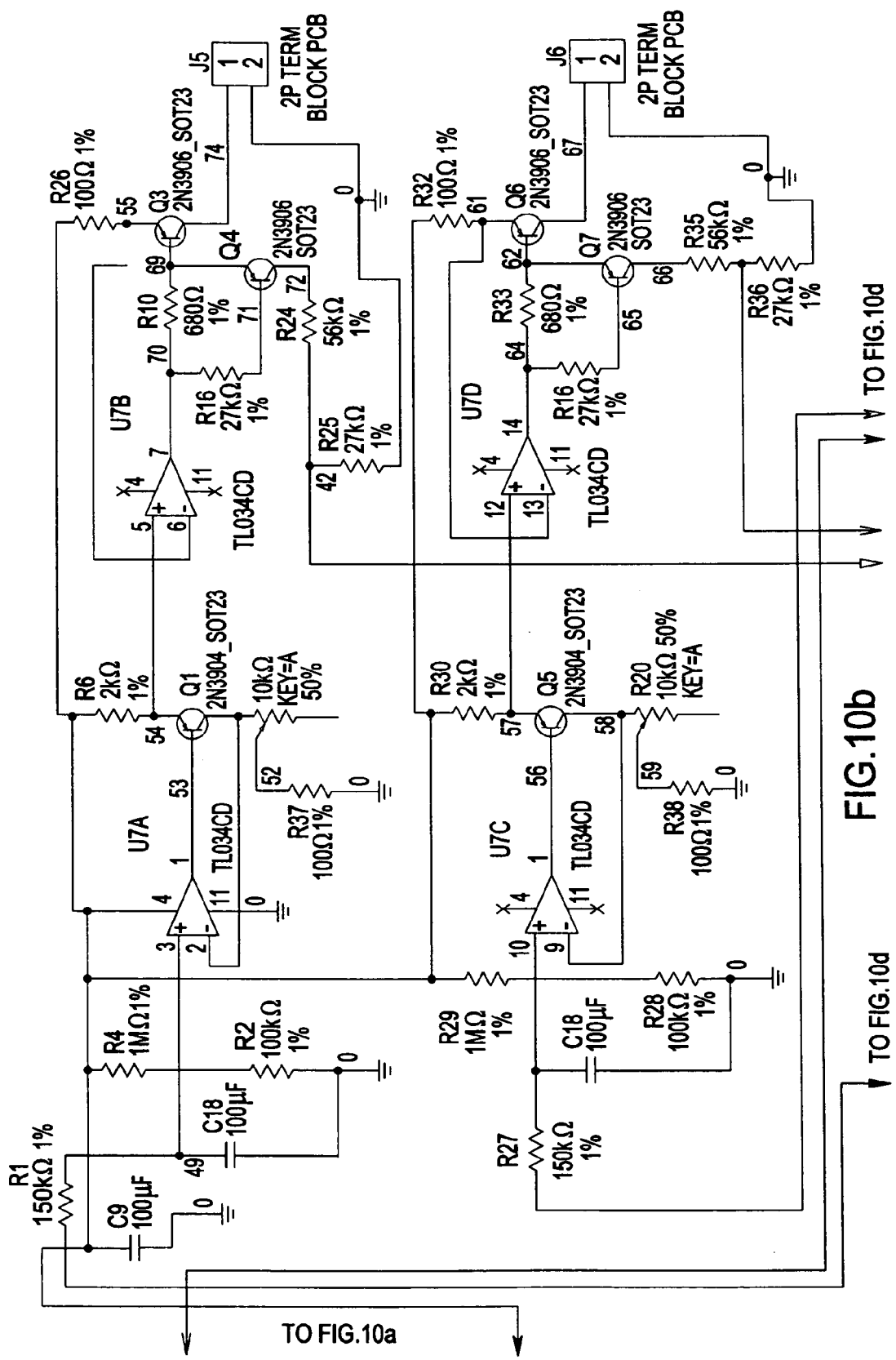
Figure 10C:
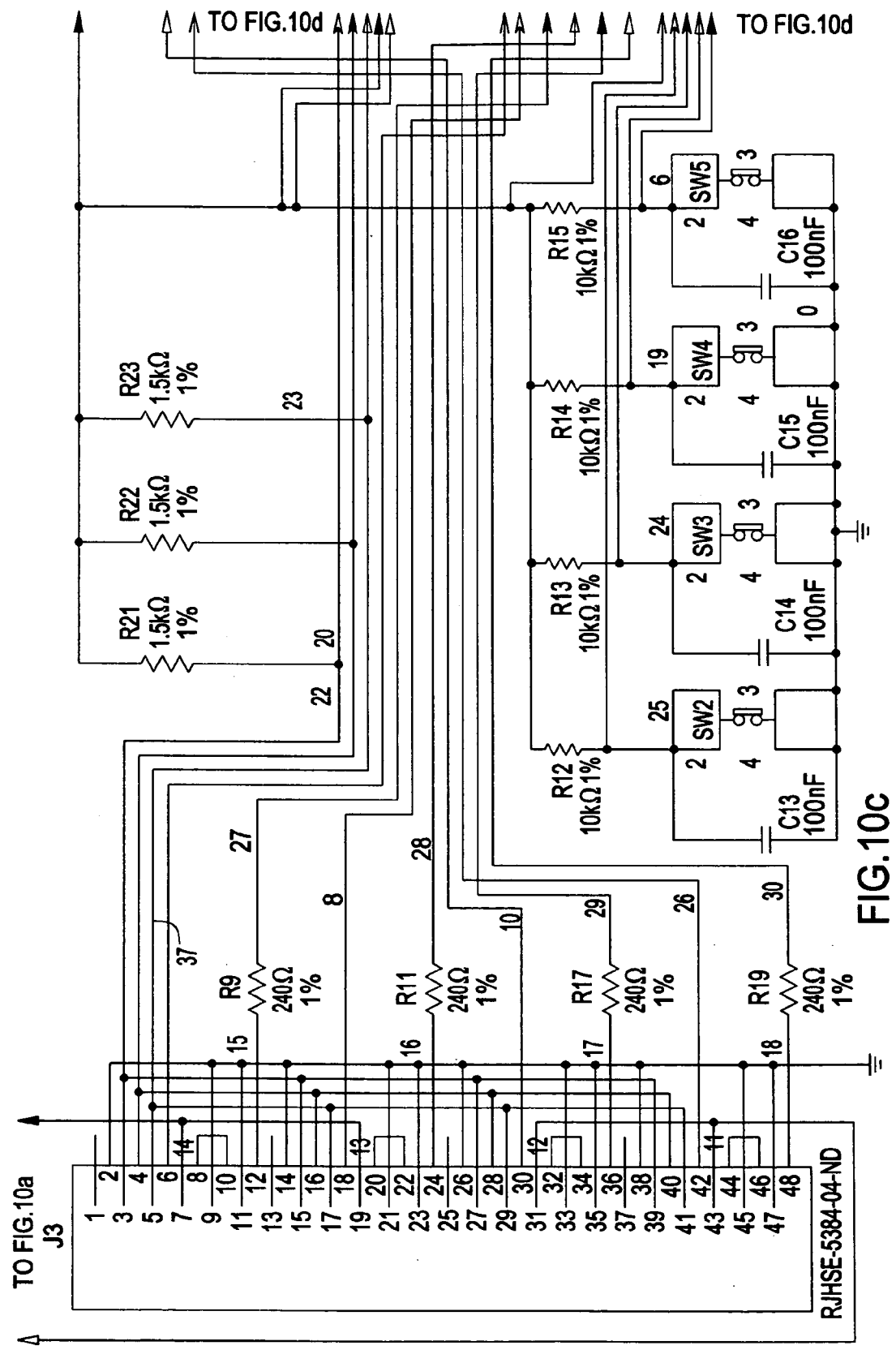
Figure 10D:
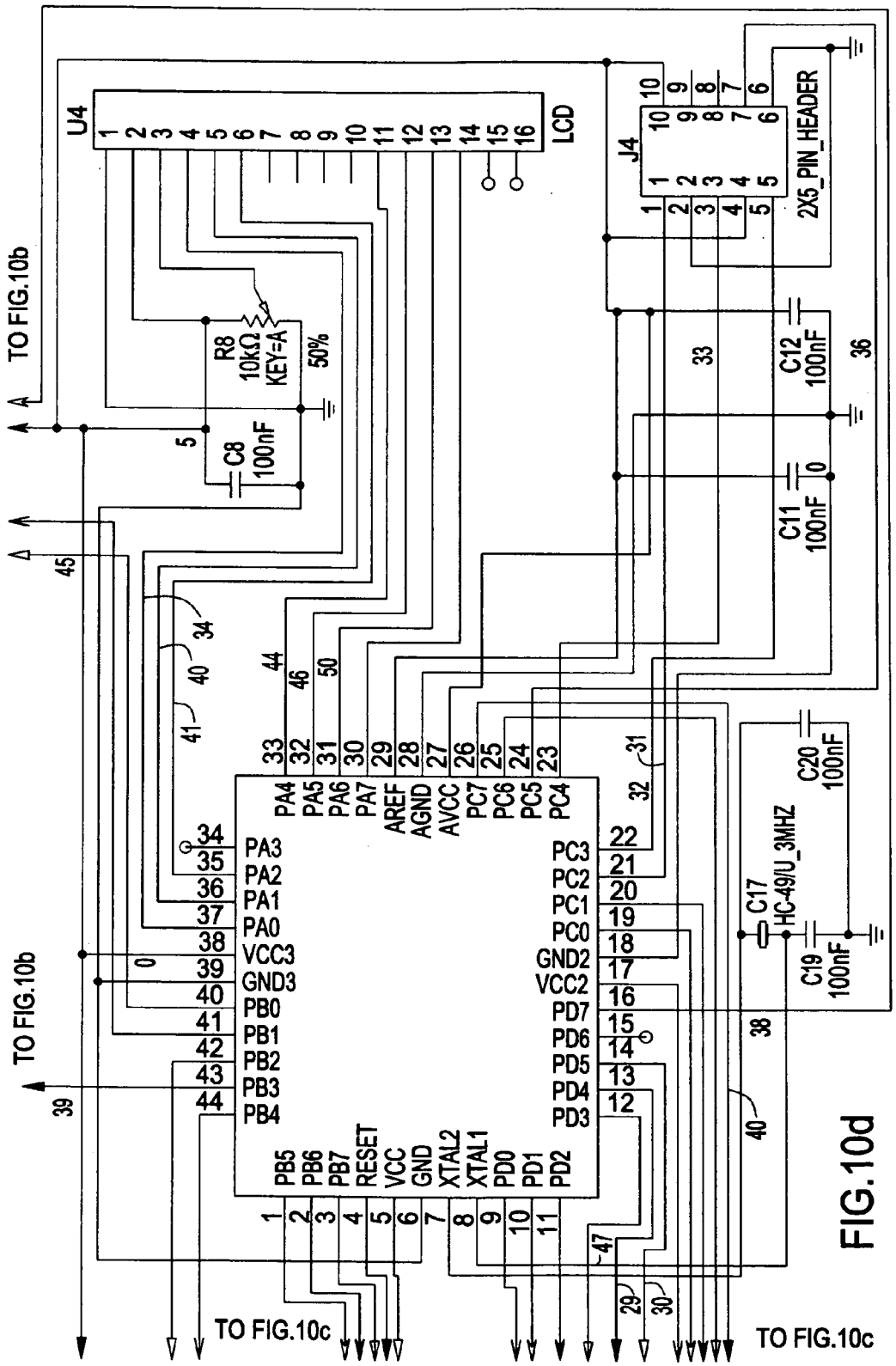

FIGS. 10a, 10b, 10c, 10d is a schematic of the transmitter circuit. FIG. 12 is a layout for FIGS. 10a, 10b, 10c, 10d. With the large amount of current required for the sensors, 3 amperage diodes (D1, D2) are required to supply the proper amount of current in the half wave rectification circuit. Using diodes with a smaller current rating may cause the circuit to fail with inrush current when the circuit turns on. Two 1000 uF capacitors (C1, C2) are used to filter the half wave rectification into a constant 34 VDC. A buck regulator (LM2595) (U2,U8) is used to step the voltage down to 12 VDC. This prevents the 5 volt regulator (U1) from going into thermal shutdown.

A 2.5 amp fast acting fuse (F1) is utilized to protect the electronics. In the event that a user wires the transmitter incorrectly, the fuse will blow protecting the circuit.

The transmitters include a 16×2 character LCD display (U4) that indicates airflow, temperature and system status. The display is used during configuration and diagnostic modes. Field configuration is accomplished using a simple four-button interface on the main circuit board. Individual airflow and temperature measurements can be displayed by scrolling through the sensors using the up and down interface buttons. The airflow output signal is filtered using the LCD (U4) and 4 button interface (SW2, SW3, SW4, SW5, see FIG. 9). The filter takes place in microprocessor software. A potentiometer (R8) is used to set the LCD contrast.

The offset and gain is set using the four button interface. The offset and gain is applied by the software in the microprocessor, see U5 of FIG. 10.

Each probe contains a microprocessor, in this case an Atmega 32L-8MU-ND. Each microprocessor (U5) utilizes the ADC to read each of the analog values from the sensor circuit (FIG. 7). Microprocessor (U5) on the transmitter circuit communicates with each multiplexer (FIG. 11) in the probe 10 by serial peripheral communication "SPI".

Figure 9:
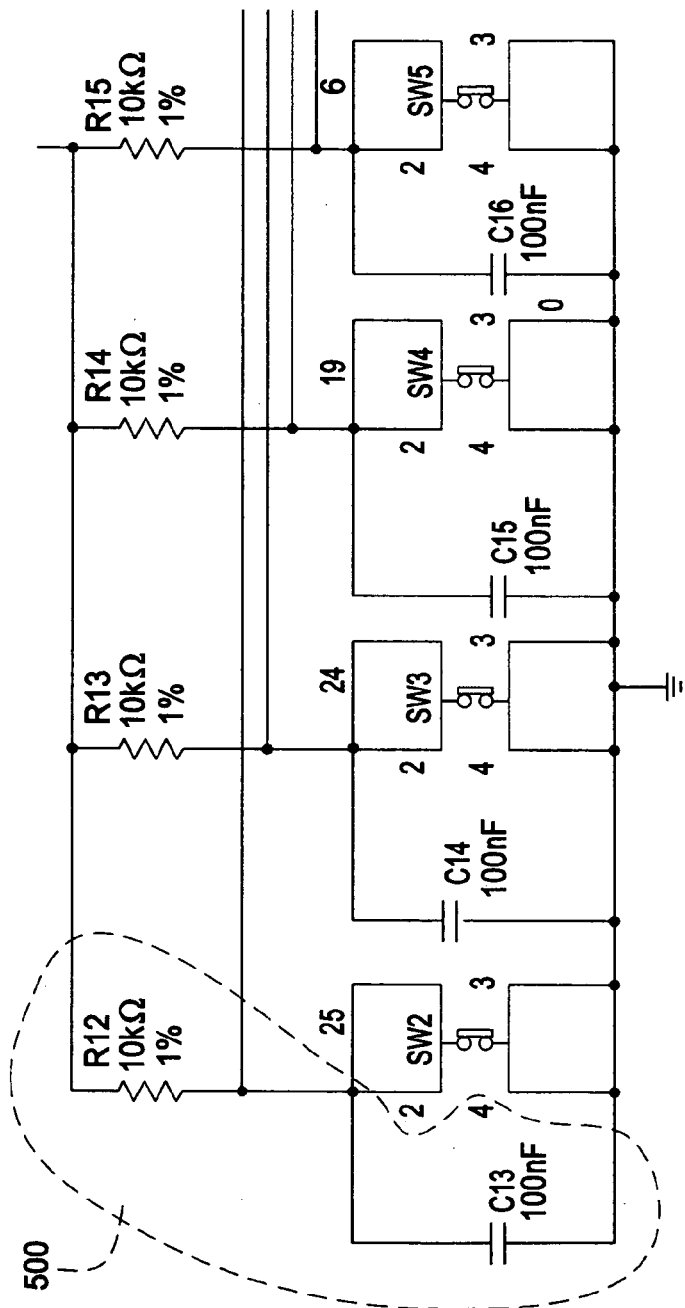
FIG. 9 is a schematic of the de-bounce circuit in the transmitter circuit.
Figure 14:
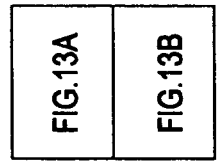
FIG. 14 is a layout for FIGS. 13a and 13b.

The de-bounce circuit 500 of the transmitter circuit is shown in FIG. 9. The de-bounce circuit is used to prevent the microprocessor from misinterpreting logic levels. Without this circuit the microprocessor sees multiple toggles of the I/O line and acts accordingly, see FIG. 9.

Adjustments to the calibrated airflow readings can be made by adjusting the offset and gain through the general user interface. An interface menu for the air balancer will provide the ability to read the velocity and temperature at each point throughout the construction of the unit.

A low limit can be set that forces the output to zero when the airflow rate fall below the user defined value. This is accomplished in the user interface menu. The low limit auto zero is accomplished in the microprocessor software.

The numerical values shown for each component, for example resistors and capacitors, in the circuits described in this specification are examples only, and are not intended to limit the scope or application of the circuits depicted.

Figure 11:
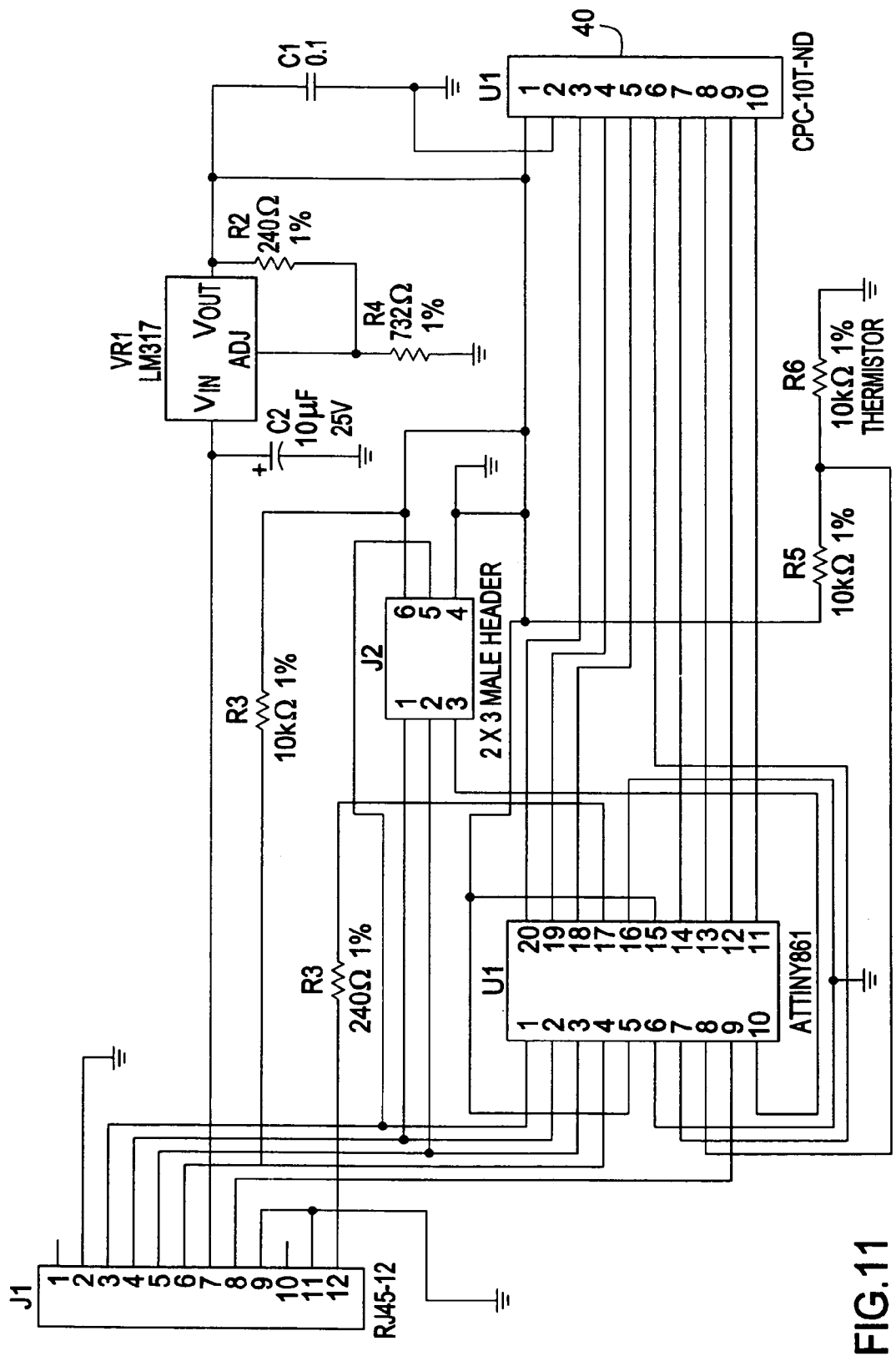
FIG. 11 is a schematic of the multiplexer circuit.

FIG. 11 is a schematic of the multiplexer circuit. Each probe 10 includes an integral multiplexing unit. Calibration data which corresponds to each thermistor 31, 32 is stored in the multiplexing unit memory. Since the calibration data is stored in this manner, the sensor pairs can be connected to the transmitter in any order or configuration. After the multiplexing unit collects the data from each sensor 31, 32 it sends a digital signal to the transmitter. The sensor circuit (FIG. 7) is connected to the multiplexer through U1.

FIG. 13 is a schematic for the router. The router circuit interfaces the sensor circuit (FIG. 7) to the multiplexer (FIG. 11) and the transmitter (FIGS. 10a, 10b, 10c, 10d). The sensor circuit connects to the router at terminals J3, J4, J5 or J6. The router then connects to the multiplexer by a ribbon cable from terminal J2 of the router to U1 of the multiplexer. The multiplexer connects to the transmitter from J1 by CAT5e cable. The router is powered by a separate CAT5e cable from the transmitter on terminal J1 of the router.

Although a form of the invention has been described herein, it will be obvious to those skilled in the art that variations may be made in the construction and relation of parts without departing from the spirit and scope of the invention described herein.

We claim:

1. A fan air flow sensor comprising:
 a housing having a sensor cap;
 a thermistor pair disposed within the housing and in housing potting to prevent movement of the thermistor pair in the housing, each thermistor projecting through the sensor cap a predetermined distance above the sensor cap up to approximately 0.03 inches, the sensor cap disposed to protect the thermistor pair from airborne particulate;
 a flange extending normally from the housing, the flange for flush mounting the housing on a mounting surface;
 a sensor circuit comprising a multiplexer for controlling each thermistor, and for measuring a condition of each thermistor, and for receiving and transmitting signals, and a microprocessor to calculate air velocity and temperature;
 a control transmitter connected to the multiplexer for displaying the air velocity and temperature; and
 a cable for connecting the sensor to a multiplexing circuit.

2. The fan mass air flow measurement sensor as in claim 1, wherein the sensor cap comprises stainless steel.

3. The fan mass air flow sensor as in claim 1, wherein the flange further comprises a notch for receiving the cable.

4. The fan mass air flow sensor as in claim 1, wherein the flange receives fasteners for attaching the flange to a mounting surface.

5. A fan air flow measurement system comprising:
a fan having an inlet;
a sensor having a substantially flush mounting to a surface of the inlet;
the sensor comprising a housing having a sensor cap;
a thermistor pair disposed within the housing and in housing potting to prevent movement of the thermistor pair in the housing, each thermistor projecting through the sensor cap a predetermined distance above the sensor cap up to approximately 0.03 inches, the sensor cap disposed to protect the thermistor pair from airborne particulate;
a flange extending normally from the housing, the flange engagable with a mounting surface;
a sensor circuit comprising a multiplexer for controlling each thermistor, and for measuring a condition of each thermistor, and for receiving and transmitting signals;
a cable for connecting the sensor to a multiplexer circuit;
the multiplexer circuit connected to a transmitter circuit.

6. The fan air flow measurement system as in claim 5 further comprising a plurality of sensors, each having a substantially flush mounting to the fan inlet.

7. The fan air flow measurement system as in claim 5, wherein the fan comprises a centrifugal fan.

8. The fan air flow measurement system as in claim 6, wherein:
the fan inlet comprises an inlet bell and the sensors are mounted at the narrowest portion (D) of the inlet bell; and
each sensor is connected to the multiplexer circuit.

9. The fan air flow measurement system as in claim 5, wherein each thermistor pair further comprises a microprocessor for storing calibration date for the thermistor pair.

* * * * *